US007701331B2

(12) United States Patent
Tran (10) Patent No.: US 7,701,331 B2
(45) Date of Patent: *Apr. 20, 2010

(54) MESH NETWORK DOOR LOCK (76) Inventor: Bao Q. Tran, 6768 Meadow Vista Court, San Jose, CA (US) 95135

( * ) Notice: Subject to any disclaimer, the term of this patent is extended or adjusted under 35 U.S.C. 154(b) by 937 days.

This patent is subject to a terminal disclaimer.

(21) Appl. No.: 11/451,200

(22) Filed: Jun. 12, 2006

(65) Prior Publication Data
US 2007/0290793 A1 Dec. 20, 2007

(51) Int. Cl.
G08B 1/08 (2006.01)
G08C 19/00 (2006.01)
H04M 11/04 (2006.01)

(52) U.S. Cl. .............................. 340/539.1; 340/825.69; 455/404.1

(58) Field of Classification Search ............ 340/426.28, 340/825.69, 539.1; 709/352
See application file for complete search history.

(56) References Cited

U.S. PATENT DOCUMENTS

| 4,079,605 | A |   | 3/1978  | Bartels           |
|-----------|---|---|---------|-------------------|
| 4,254,582 | A |   | 3/1981  | McGee             |
| 4,837,822 | A |   | 6/1989  | Crosley et al.    |
| 5,129,376 | A |   | 7/1992  | Parmley           |
| 5,418,525 | A | * | 5/1995  | Frei et al. ............ 340/5.6 |
| 5,471,585 | A |   | 11/1995 | Barakat et al.    |
| 5,749,253 | A |   | 5/1998  | Glick et al.      |
| 5,810,420 | A |   | 9/1998  | Welling           |
| 5,848,541 | A |   | 12/1998 | Glick et al.      |
| 5,908,273 | A |   | 6/1999  | Titus et al.      |
| 5,933,086 | A |   | 8/1999  | Tischendorf et al.|
| 6,107,934 | A |   | 8/2000  | Andreou et al.    |
| 6,125,277 | A |   | 9/2000  | Tanaka            |
| 6,152,662 | A |   | 11/2000 | Titus et al.      |
| 6,297,725 | B1|   | 10/2001 | Tischendorf et al.|
| 6,499,660 | B1|   | 12/2002 | Moorhouse et al.  |
| 6,764,007 | B2|   | 7/2004  | Moorhouse et al.  |
| 6,829,243 | B1|   | 12/2004 | Sundhar           |
| 6,832,251 | B1|   | 12/2004 | Gelvin et al.     |
| 6,980,984 | B1|   | 12/2005 | Huffman et al.    |
| 7,323,970 | B1| * | 1/2008  | Murray et al. ......... 340/426.12 |
| 2002/0007563 | A1 | | 1/2002 | Myers et al.    |
| 2002/0007564 | A1 | | 1/2002 | Myers et al.    |
| 2002/0093206 | A1 | | 7/2002 | Furlong         |
| 2002/0105196 | A1 | | 8/2002 | Furlong et al.  |
| 2003/0127864 | A1 | | 7/2003 | Dalsing         |
| 2003/0197594 | A1 | | 10/2003| Olson et al.    |
| 2004/0076837 | A1 | | 4/2004 | Hein et al.     |
| 2004/0160068 | A1 | | 8/2004 | Dalsing         |
| 2004/0160069 | A1 | | 8/2004 | Fishencord      |
| 2004/0172993 | A1 | | 9/2004 | Furlong         |
| 2004/0174020 | A1 | | 9/2004 | Fishencord      |
| 2004/0174023 | A1 | | 9/2004 | Fishencord      |
| 2004/0203379 | A1 | | 10/2004| Witkowski et al.|
| 2005/0072197 | A1 | | 4/2005 | Evans et al.    |
| 2005/0246866 | A1 | | 11/2005| Dalsing et al.  |
| 2005/0266831 | A1 | | 12/2005| Roth            |

(Continued)

Primary Examiner—Benjamin C Lee
Assistant Examiner—Cal Eustaquio
(74) Attorney, Agent, or Firm—Tran & Associates (57) ABSTRACT Systems and methods are disclosed for sending a code from a mesh network key and wirelessly communicating the code with one or more mesh network appliances over a mesh network such as ZigBee; receiving the code over the mesh network by a mesh network lock controller; and providing access to the secured area upon authenticating the code.

20 Claims, 5 Drawing Sheets

U.S. PATENT DOCUMENTS

| | | |
|---|---|---|
| 2005/0266863 A1 | 12/2005 | Benco et al. |
| 2006/0025891 A1* | 2/2006 | Budike .................. 700/275 |
| 2006/0030290 A1* | 2/2006 | Rudolf et al. ............ 455/404.1 |
| 2006/0077968 A1 | 4/2006 | Pitsouladkis et al. |
| 2006/0081024 A1 | 4/2006 | Heimbuck |
| 2006/0101878 A1 | 5/2006 | Dickhaus et al. |
| 2006/0103503 A1* | 5/2006 | Rodriguez ................ 340/5.71 |
| 2006/0154642 A1* | 7/2006 | Scannell .................. 455/404.1 |
| 2006/0164205 A1* | 7/2006 | Buckingham et al. ........ 340/5.6 |
| 2007/0146118 A1* | 6/2007 | Rodriguez et al. ......... 340/5.71 |
| 2008/0062000 A1* | 3/2008 | Styers et al. ............. 340/686.1 |
| 2008/0062013 A1* | 3/2008 | Face et al. .................... 341/20 |

* cited by examiner

MESH NETWORK DOOR LOCK

BACKGROUND

Main types of locks include mortise, cylindrical, and rim. These designations are based on the design of the lock, how and where it engages, and how it is mounted to the door. Mortise locks are generally considered the heaviest duty products in the marketplace. They are typically used in area of high traffic or heavy commercial usage, where greater security is required. A mortise lock is installed in a mortised pocket in the door, with the housing of the lock contained in the door. The cylinder is screwed through the skin of the door directly into the metal lock case, with only the cylinder head and spin ring projecting from the face of the door. The lock case may contain a dead bolt as well as the normal dead latch for added strength and security. Cylindrical locks are a simpler design installed in two intersecting holes in the door. Normally a 2⅛" hole through the face of the door intersects either a ⅞" or 1" diameter hole from the edge. The cylinder is contained in the outside knob or lever, away from the surface of the door. Rim locks are mounted to the inside surface of the door, with a cylinder installed on the outside surface in a hole bored through the door. They typically have either a spring latch or dead bolt operation, engaging a strike mounted to the frame around the door. There are several types of dead bolt mechanisms found on rim locks. Lock cylinders in these and all locks may be designed for standard keys readily available at local hardware stores or controlled access/high security keys, which are available only from the manufacturer and selected locksmiths.

Electrical and electrified products are typically electrically operated mechanical locks and include electromagnetic locks, alarmed or delayed exit devices, electric latch releases, auxiliary alarm locks, touch keys, card readers, keypads and other electrified means of activating or controlling a lock. In most cases, the outside lever is unlocked by a solenoid instead of a key, although a key can provide an override or safety feature. The main benefit of electronic access control is a more flexible and higher level of key control than the typical mechanical key system.

Commercial cylindrical and mortise locks may have several different functions to suit almost every combination of convenience and security requirements. The most common include passage, privacy, office, entry, classroom, and storeroom. Passage sets are not locks in the true sense of the word, but incorporate a lever or knob on either side of the door and a latch to hold the door shut. There is no provision for a key, as no lock cylinder is included. Privacy locks are the type used in a public restroom, or perhaps a residential bedroom or bathroom. They contain no cylinder and do not have a key. However, they can be locked from the inside for privacy, usually by a pushbutton built into the knob or lever. They generally include a provision for emergency access from the outside, often using a small screwdriver or pin to unlock the outside knob or lever through a hole in the trim. Hospital privacy latches have thumb turns on both sides so a nurse or attendant can gain entry to a patient's bathroom quickly in an emergency. Office locks are locked from the inside by a pushbutton. The outside lever or knob remains locked until unlocked with a key from the outside or by rotating the inside lever trim. The inside knob or lever is always free for immediate exit. Entrance or entry locks maybe locked by pushing and turning a button and are unlocked by key until the inside button is manually unlocked. They are also available with pushbutton locking, in which pushing the button locks the outside knob or lever until it is unlocked by key or by turning the inside knob or lever. The inside knob or lever is always free for immediate exit. Classroom locks (maintained) are always locked and unlocked from the outside by key. The inside knob or lever is always free for immediate exit. Storeroom locks (momentary) have a fixed outside knob or lever, and the latch is retracted by the key from the outside. The inside knob or lever is always free for immediate exit.

Locks are available in different grades, which relate to their construction and durability. These grades are a measure of application suitability. Most commercial applications require either Grade 1 or Grade 2 locking products. ANSI/NHMA standards, monitored by independent testing laboratories, separate Grade 1 from Grade 2. Typically, Grade 1 locks must meet twice the requirements of Grade 2. In cycle tests for example, a Grade 2 lock need only function for 400,000 cycles, while a Grade 1 lock must meet at least 800,000 cycles. Some manufacturers regularly test beyond that limit into the millions of cycles.

Typical products available as Grade 1 include cylindrical key and lever locks, mortise locks, heavy-duty mortise, auxiliary deadbolts, and the locks used with electronic or other access control hardware. For most high-traffic areas, such as schools, heavily used offices, stores or other public buildings, a Grade 1 mortise lock is preferred. Because its case is much larger than that of a cylindrical lock, it can be built to incorporate parts with thicker cross-sections and greater strength. An alternative would be a Grade 1 cylindrical key and lever lock, which is probably the most popular for retrofitting because little or no additional prep is required. For example, converting from a cylindrical knob set to a lever in order to meet ADA requirements usually entails drilling only two holes. To achieve higher security where heavy use or abuse is expected, combine the Grade 1 cylinder lock with an auxiliary deadbolt, providing this combination is allowed by the local building codes.

On a parallel note, electrically actuated overhead garage door opener assemblies have been in use for a relatively long period of time functional for automatically opening and closing garage doors through control by either an interior control switch or remote control means normally carried in the automobile making use of the garage. As discussed in U.S. Pat. No. 4,254,582, automatic garage door openers are commonly installed for opening and closing garage doors of the solid or single-piece assembly type wherein the garage door is pivotally mounted movable from closed position pivotally upwardly and rearwardly to an overhead, nearly horizontal position. With this type of garage door installation, two basic forms of automatic garage door opener assemblies are used, one of the friction engagement form and one of the rack and pinion form. With the friction engagement form, the electrically actuated garage door opener having an upper extremity of the door connected thereto travels rearwardly and forwardly along a nearly horizontal guide track with resilient rollers of the opener frictionally engaged with the guide track to supply the relative motion therebetween. In the rack and pinion form, the relative motion is supplied by a rotatable pinion of the opener moving along a rack of the guide track.

SUMMARY

In one aspect, systems and methods are disclosed for sending a code from a mesh network key and wirelessly communicating the code with one or more mesh network appliances over a mesh network such as ZigBee; receiving the code over the mesh network by a mesh network lock controller; and providing access to the secured area upon authenticating the code.

In another aspect, an electronic door lock system includes an electrically actuated arm having a first position to allow access to an area and a second position to secure the area; a mesh network to wirelessly communicate with one or more appliances; a mesh network key coupled to the mesh network to send a code; a mesh network lock controller coupled to the electrically actuated arm and to the mesh network, said controller moving the electrically actuated arm to the first position upon authenticating the code. Implementations of the above systems may include one or more of the following. The mesh network can be an 805.15 network (ZigBee). Voice message can be captured by one of: the mesh network key and the mesh network lock controller. The message can be sent to a remote listener using one of: Plain Old Telephone Service (POTS), cellular telephone service, Voice Over Internet Protocol (VOIP). The code to open the door can be a cryptographic code. The electrically actuated arm can be a motor driving a garage door and wherein the mesh network lock controller opens the garage door on command from the mesh network key. The electrically actuated arm opens one or more car door locks. The electrically actuated arm applies power to an appliance to turn on the appliance. The mesh network appliance can be home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, or remote diagnostic machine. The mesh network can be connected to a wide area network including the Internet. An in-door positioning system can be in communication with to one or more mesh network appliances to provide location information. A call center can receive information from the mesh network to provide a human response. A web server can be connected to the mesh network and to the POTS to provide information to an authorized remote user. A wireless router can be connected to the mesh network and wherein the wireless router comprises one of: 802.11 router, 802.16 router, WiFi router, WiMAX router, Bluetooth router, X10 router. The mesh network appliance can be connected to a power line to communicate X10 data to and from the mesh network.

In other aspects, a system includes a mesh network; a mesh network communicator base station in communication with the mesh network, the mesh network communicator base station including a communicator jack wired to a plain old communicator service (POTS) or a public switched communicator network (PSTN) land-line; and a communicator in communication with the communicator base station over the mesh network. Implementations of this system may include one or more of the following. The mesh network can be an 805.15 network, a ZigBee network or a compatible 2.4 GHz network. The communicator records a message from a caller, wherein the communicator answers two calls by selecting a first line or a second line and wherein the communicator receives distinctive ring tones and rings with a melody or distinctive ring pattern. The communicator can be a Voice Over Internet Protocol (VOIP) communicator. A remote server can communicate with the mesh network through the Plain Old Communicator System (POTS) or the Public Switched Communicator Network (PSTN), the server receiving a search query from the communicator; the server searching one or more databases based on the search query and returning a search result on the display. A third party associated with one of the search results is selected to call back the communicator. The server can transmit the communicator's caller identification (Caller ID) number to the entity for calling back the communicator and wherein the third party pays a fee for each Caller ID. The databases can be a regular database or a federated database providing taxonomy of: music, food, restaurant, movie, map, communicator directory, news, blogs, weather, stocks, calendar, sports, horoscopes, lottery, messages, traffic, or direction. The system includes one or more mesh network appliances to provide home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, or remote diagnotics. The communicator can be connected to a cellular communicator to answer calls directed at the cellular communicator. The connection can be wired or wireless using Bluetooth or ZigBee. The communicator synchronizes calendar, contact, emails, blogs, or instant messaging with the cellular communicator. Similarly, the communicator synchronizes calendar, contact, emails, blogs, or instant messaging with a personal computer. The system can include a patient monitoring appliance coupled to the POTS or PSTN through the mesh network. The patient monitoring appliance monitors drug usage and patient falls. The patient monitoring appliance monitors patient movement. An in-door positioning system links one or more mesh network appliances to provide location information. A call center can call to the communicator to provide a human response. A web server can communicate with the Internet through the POTS to provide information to an authorized remote user who logs into the server. A wireless router such as 802.11 router, 802.16 router, WiFi router, WiMAX router, Bluetooth router, X10 router can be connected to the mesh network. A mesh network appliance can be connected to a power line to communicate X10 data to and from the mesh network.

In yet another aspect, a door lock system includes a cordless communicator having a ZigBee transceiver to communicate digitized voice and data over a ZigBee wireless link; and a base station wirelessly coupled to the cordless communicator over the ZigBee wireless link, the base station having a communicator jack coupled to a plain old communicator service (POTS) or a public switched communicator network (PSTN) land-line. In implementations, a server located on the POTS or PSTN office can receive a search query from the communicator; the server searching one or more databases based on the search query and returning a search result to display on the communicator, wherein the server provides information to one of: directory assistance, yellow page directory, white page directory, search engine, music, food, restaurant, movie, map, communicator directory, news, blogs, weather, stocks, calendar, sports, horoscopes, lottery, messages, traffic, direction, wherein the server transmits the communicator's caller identification (Caller ID) number to a third party to call back the communicator and wherein the third party pays a fee for each Caller ID. Implementations of the above may include one or more of the following. The system can capture a verbal search request and transmitting the verbal search request to the search engine. The verbal search request comprises one of: phoneme, diphone, triphone, syllable, demisyllable, cepstral coefficient, cepstrum coefficient. The search user can designate an entity from one of the search results to call back the communicator. One way to select is to click on a link and click on a subsequent button to confirm that the company associated with the link should call the user's communicator and the system can transmit the communicator's caller identification (Caller ID) number to the entity for calling back the communicator. The entity pays a fee for each Caller ID for referral fee, advertising fee, membership fee, or any other suitable business model fees. The communicator can be a Voice Over Internet Protocol (VOIP) communicator, a cellular communicator, a WiFi communicator, a WiMAX communicator. The phone can provide directions to one of: a store, a retailer, a company, a venue. The taxonomic databases can be music, food, restaurant, movie, map, communicator directory, news, blogs, weather, stocks, calendar, sports, horoscopes, lottery, messages, or traffic database. The system can perform automated position determination with one of: triangulation based location determination, WiFi location determination, GPS, assisted GPS, GLONASS, assisted GLONASS, GALILEO, assisted GALILEO.

In another aspect, one of the appliances can be a mesh network router that includes a modem coupled to a wide area network, one or more 802.11 (WiFi) radios coupled to the modem and one or more 802.15 (ZigBee) radios coupled to the modem. In one implementation, the modem can be a landline modem, a DSL modem, a cable modem, or a cellular modem. In another implementation, the mesh router can include a Bluetooth radio or an ultra wideband (UWB) radio.

In another aspect, a mesh network router includes a modem coupled to a wide area network, one or more 802.16 (WiMax) radios coupled to the modem and one or more 802.15 (ZigBee) radios coupled to the modem. In one implementation, the modem can be a landline modem, a DSL modem, a cable modem, or a cellular modem. In another implementation, the mesh router can include a Bluetooth radio or an ultra wideband (UWB) radio.

Advantages of the system may include one or more of the following. The system is inexpensive to manufacture and provides a full-featured home/office wireless network that provides security and voice communication. The system provides a simple, "pick-proof" low power lock configuration that is compatible with the internal mechanical locking mechanisms of universally used conventional key-operated door latch locks. The system is compatibly usable with, and can be readily be designed by lock manufacturers into, existing door latch lock structures with a minimum of engineering or production tooling effort or cost. Virtually all existing conventional mechanical lock structures use the rotational motion of a mechanical key about the axis of the key acceptor cylinder to move a locking member. The rotational motion of the key is either directly used to rotate a locking member or is immediately translated into linear motion of a locking member which moves generally along the axis of the key acceptor cylinder. Such simplicity and effectiveness of the conventional mechanical door latch locks has not been heretofore duplicated by the complicated, high power consuming or ineffective prior art electronic lock structures.

DESCRIPTION

Figure 1:
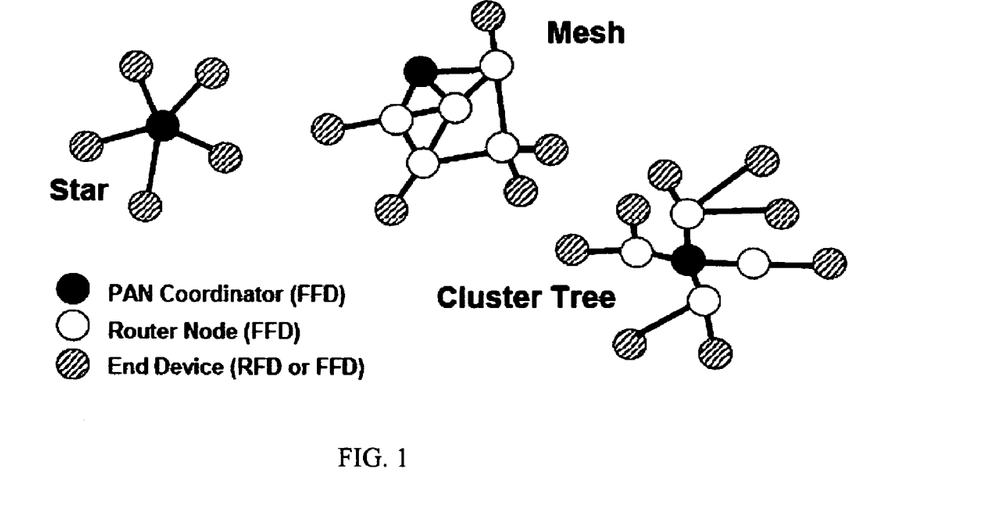
FIG. 1 shows a typical organization of a mesh network that includes a mesh network door lock.

FIG. 1 shows an exemplary mesh network that includes a mesh network door lock. The door lock has a communicator such as a walkie-talkie that allows a person on the outside of the room or facility to communicate with another person inside the room or facility. The mesh network includes appliances such as a mesh network communicator including a wired communicator and a cordless communicator. In one embodiment, the mesh network is an IEEE 802.15.4 (ZigBee) network.

IEEE 802.15.4 defines two device types; the reduced function device (RFD) and the full function device (FFD). In ZigBee these are referred to as the ZigBee Physical Device types. In a ZigBee network a node can have three roles: ZigBee Coordinator, ZigBee Router, and ZigBee End Device. These are the ZigBee Logical Device types. The main responsibility of a ZigBee Coordinator is to establish a network and to define its main parameters (e.g. choosing a radio-frequency channel and defining a unique network identifier). One can extend the communication range of a network by using ZigBee Routers. These can act as relays between devices that are too far apart to communicate directly. ZigBee End Devices do not participate in routing. An FFD can talk to RFDs or other FFDs, while an RFD can talk only to an FFD. An RFD is intended for applications that are extremely simple, such as a light switch or a passive infrared sensor; they do not have the need to send large amounts of data and may only associate with a single FFD at a time. Consequently, the RFD can be implemented using minimal resources and memory capacity and have lower cost than an FFD. An FFD can be used to implement all three ZigBee Logical Device types, while an RFD can take the role as an End Device.

One embodiment supports a multicluster-multihop network assembly to enable communication among every node in a distribution of nodes. The algorithm should ensure total connectivity, given a network distribution that will allow total connectivity. One such algorithm of an embodiment is described in U.S. Pat. No. 6,832,251, the content of which is incorporated by referenced. The '251 algorithm runs on each node independently. Consequently, the algorithm does not have global knowledge of network topology, only local knowledge of its immediate neighborhood. This makes it well suited to a wide variety of applications in which the topology may be time-varying, and the number of nodes may be unknown. Initially, all nodes consider themselves remotes on cluster zero. The assembly algorithm floods one packet (called an assembly packet) throughout the network. As the packet is flooded, each node modifies it slightly to indicate what the next node should do. The assembly packet tells a node whether it is a base or a remote, and to what cluster it belongs. If a node has seen an assembly packet before, it will ignore all further assembly packets.

The algorithm starts by selecting (manually or automatically) a start node. For example, this could be the first node to wake up. This start node becomes a base on cluster 1, and floods an assembly packet to all of its neighbors, telling them to be remotes on cluster 1. These remotes in turn tell all their neighbors to be bases on cluster 2. Only nodes that have not seen an assembly packet before will respond to this request, so nodes that already have decided what to be will not change their status. The packet continues on, oscillating back and forth between "become base/become remote", and increasing the cluster number each time. Since the packet is flooded to all neighbors at every step, it will reach every node in the network. Because of the oscillating nature of the "become base/become remote" instructions, no two bases will be adjacent. The basic algorithm establishes a multi-cluster network with all gateways between clusters, but self-assembly time is proportional with the size of the network. Further, it includes only single hop clusters. Many generalizations are possible, however. If many nodes can begin the network nucleation, all that is required to harmonize the clusters is a mechanism that recognizes precedence (e.g., time of nucleation, size of subnetwork), so that conflicts in boundary clusters are resolved. Multiple-hop clusters can be enabled by means of establishing new clusters from nodes that are N hops distant from the master.

Having established a network in this fashion, the masters can be optimized either based on number of neighbors, or other criteria such as minimum energy per neighbor communication. Thus, the basic algorithm is at the heart of a number of variations that lead to a scalable multi-cluster network that establishes itself in time, and that is nearly independent of the number of nodes, with clusters arranged according to any of a wide range of optimality criteria. Network synchronism is established at the same time as the network connections, since the assembly packet(s) convey timing information outwards from connected nodes.

The network nodes can be mesh network appliances to provide voice communications, home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, or remote diagnotics. The communicator can be connected to a cellular communicator to answer calls directed at the cellular communicator. The connection can be wired or wireless using Bluetooth or ZigBee. The communicator synchronizes calendar, contact, emails, blogs, or instant messaging with the cellular communicator. Similarly, the communicator synchronizes calendar, contact, emails, blogs, or instant messaging with a personal computer. A web server can communicate with the Internet through the POTS to provide information to an authorized remote user who logs into the server. A wireless router such as 802.11 router, 802.16 router, WiFi router, WiMAX router, Bluetooth router, X10 router can be connected to the mesh network.

A mesh network appliance can be connected to a power line to communicate X10 data to and from the mesh network. X10 is a communication protocol that allows up to 256 X10 products to talk to each other using the existing electrical wiring in the home. Typically, the installation is simple, a transmitter plugs (or wires) in at one location in the home and sends its control signal (on, off, dim, bright, etc.) to a receiver which plugs (or wires) into another location in the home. The mesh network appliance translates messages intended for X10 device to be relayed over the ZigBee wireless network, and then transmitted over the power line using a ZigBee to X10 converter appliance.

An in-door positioning system links one or more mesh network appliances to provide location information. Inside the home or office, the radio frequency signals have negligible multipath delay spread (for timing purposes) over short distances. Hence, radio strength can be used as a basis for determining position. Alternatively, time of arrival can be used to determine position, or a combination of radio signal strength and time of arrival can be used. Position estimates can also be achieved in an embodiment by beamforming, a method that exchanges time-stamped raw data among the nodes. While the processing is relatively more costly, it yields processed data with a higher signal to noise ratio (SNR) for subsequent classification decisions, and enables estimates of angles of arrival for targets that are outside the convex hull of the participating sensors. Two such clusters of ZigBee nodes can then provide for triangulation of distant targets. Further, beamforming enables suppression of interfering sources, by placing nulls in the synthetic beam pattern in their directions. Another use of beamforming is in self-location of nodes when the positions of only a very small number of nodes or appliances are known such as those sensors nearest the wireless stations. In one implementation where each node knows the distances to its neighbors due to their positions, and some small fraction of the nodes (such as those nearest a PC with GPS) of the network know their true locations. As part of the network-building procedure, estimates of the locations of the nodes that lie within or near the convex hull of the nodes with known position can be quickly generated. To start, the shortest distance (multihop) paths are determined between each reference node. All nodes on this path are assigned a location that is the simple linear average of the two reference locations, as if the path were a straight line. A node which lies on the intersection of two such paths is assigned the average of the two indicated locations. All nodes that have been assigned locations now serve as references. The shortest paths among these new reference nodes are computed, assigning locations to all intermediate nodes as before, and continuing these iterations until no further nodes get assigned locations. This will not assign initial position estimates to all sensors. The remainder can be assigned locations based on pairwise averages of distances to the nearest four original reference nodes. Some consistency checks on location can be made using trigonometry and one further reference node to determine whether or not the node likely lies within the convex hull of the original four reference sensors.

In two dimensions, if two nodes have known locations, and the distances to a third node are known from the two nodes, then trigonometry can be used to precisely determine the location of the third node. Distances from another node can resolve any ambiguity. Similarly, simple geometry produces precise calculations in three dimensions given four reference nodes. But since the references may also have uncertainty, an alternative procedure is to perform a series of iterations where successive trigonometric calculations result only in a delta of movement in the position of the node. This process can determine locations of nodes outside the convex hull of the reference sensors. It is also amenable to averaging over the positions of all neighbors, since there will often be more neighbors than are strictly required to determine location. This will reduce the effects of distance measurement errors. Alternatively, the network can solve the complete set of equations of intersections of hyperbola as a least squares optimization problem.

Figure 2:
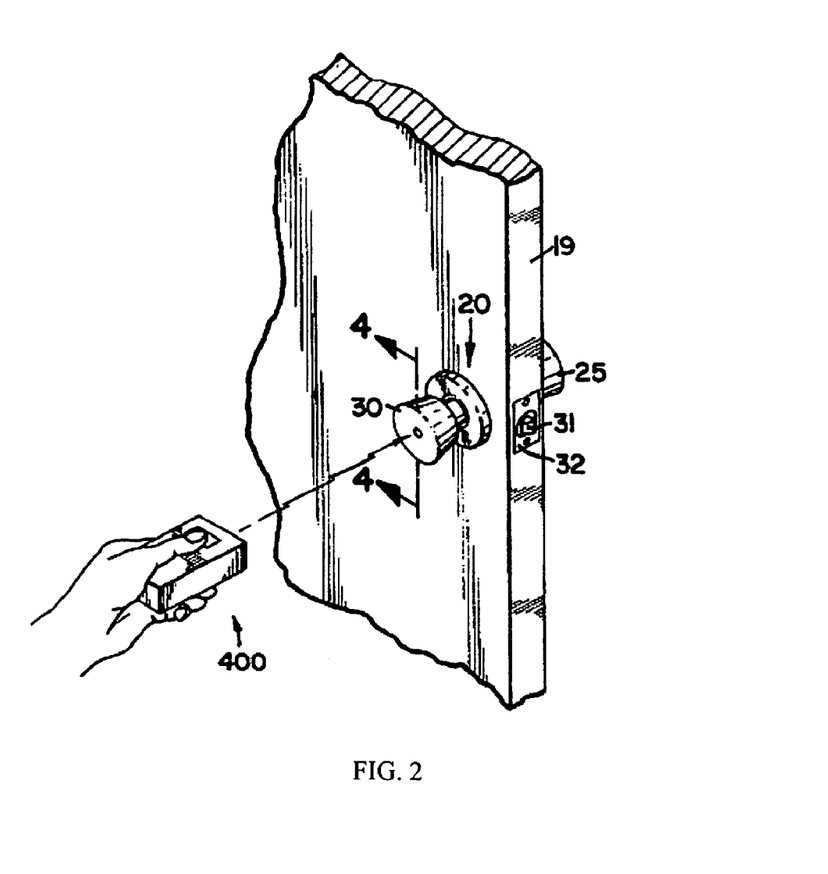
FIG. 2 shows an exemplary mesh network communicator operating with the door lock.

Referring now to FIG. 2, there is generally shown at 20 a door latch lock apparatus as operatively mounted in a door 19. The door latch 20 has interior and exterior handles 25 and 30 respectively which are cooperatively connected through linkage within the door 19 to operatively move and lock a latch member 31. The latch member 31 engages a strike plate 33 in an associated door frame (not shown) to secure or release the door 19 for pivotal motion within the door frame in a manner well known in the art. Although one embodiment thereof will be herein described, the internal linkage means of the door latch 20 that connects the handles 25 and 30 may be of varied configurations as will be appreciated by those skilled in the art. Since the details of construction and operation of such varied configurations of conventional door latch mechanisms are not relevant to an understanding of the principles of this invention, they will not be detailed herein except to provide a general overview thereof and to the extent that an understanding of the mechanical locking portions thereof may be necessary. A hollow cylindrical shaft (not shown) is rotatably mounted to a bracket for rotation under spring tension from a spring. When the door latch 20 is mounted to the door 19 the shaft extends through the cover plate. The inner door handle 25 is detachably secured to the shaft such that the shaft can be rotated against the bias of the spring by turning movement of the handle 25 as is typical to unlock the door.

The lock can be opened using a key 400. In one embodiment, a two-way communication with the lock without mechanical contact can be done using a mesh network such as Zigbee (802.15). The two-way communication can alternatively be accomplished using infrared (IR) light, radio waves such as wireless USB, Bluetooth, WiFi (802.11), WiMax (802.16), or a barcode reader, among others. The key 400 contains a circuit which transmits on command (by pressing either a "lock" or an "unlock" button on the key 400) a programmable entrance code to a sensor preferably located within the external handle 30. The circuit may be an integrated circuit (IC) or may be implemented using discrete components. The processor of the lock communicates with the key 400 over the mesh network. The entrance code can be encrypted or can be a part of a sequence of numbers that can be authenticated as a valid password. The entrance code is verified and if it matches a predetermined code which resides in a local nonvolatile memory, then an electromechanical device is actuated to switch the lock to an unlocked (or locked) state. The lock microprocessor decodes, deciphers or decrypts the data and determines if the encoded message is a valid code to open the door. If the data message is valid, it is used to program the lock and/or to operate the lock. For example, data transmitted by a valid mesh network key 400 determines the degree of security provided by a latch and a deadbolt, and when and whether a handle 25 can unlock the lock. In addition, the information communicated by the key 400 to the lock includes various forms of instruction to the lock, such as instructions for it to open when the handle 25 is turned; to open only if the deadbolt is not set; to lock out a maid; among others.

The information can specify an area that is accessible. As used here, area means a collection of one or more related locks, all of which can be opened with the same code. Area codes can be used to designate a collection of related locks. Master levels refer to a collection of related areas. The use of master levels in locks is limited to several fixed, designated locks or lock groupings and each lock is limited to a selection from among this number. The organization of the types and numbers of doors is defined by the management at each site. While a guest room with one door represents an area of one lock, the emergency area is made up of most or all the locks in the hotel or system. In both cases, a single sequence number is associated with each. A particular bit in the code or information specifies whether the area is for guest or employee access. If this bit is set, the area is considered to be an employee area. If the bit is clear, the area is considered to be a guest area. One area of all locks is the emergency area. In one embodiment, the emergency area's predetermined bit can be set to indicate deadbolt override where all locks are programmed to open at any time regardless of the position of their deadbolt on the door or regardless of the presence of a high security state. If the deadbolt override bit is not set, however, then the card cannot open the door if locked by a deadbolt or any high security state. Other area designations can be set up by the management.

In one embodiment, a magnetically-held clutch can be used to lock/unlock the door. In another embodiment, a solenoid can be used as the electromechanical device where it can be pulsed reversibly with a power transistor under the control of a relay. In its normal, inactivated state, the relay sets the polarity of the solenoid to unlock the door. When actuated by the lock processor, the relay reverses the polarity to release the solenoid for relocking the door.

In another embodiment that uses the rotation power supplied by the person who wishes to open the door, the electromechanical device is a miniature DC motor with a 256:1 gear reducer. The electromechanical device rotates a locking rod approximately ¼ turn either clockwise or counterclockwise to switch the lock to a locked or an unlocked state, respectively. When either one of the switches is engaged a signal is transmitted back to the key 400 to verify that the lock is either locked or unlocked. The key 400 can contain a bi-color LED which is turned on briefly upon receipt of the confirmation signal from the lock (e.g., green when unlocked, and red when locked). Other signals might also be incorporated such as an audible confirmation signal. The mechanical actuation of the door lock (i.e., opening of the door from the outside using handle 30 or from the inside using handle 25) is provided by the user after the lock is internally switched to the unlocked (or locked) state. In this embodiment, the person who wishes to open the door provides the torque to bias a spring loaded rotating shaft to retract the door latch. Since the DC motor only rotates the locking rod and cam, a very small low torque motor may be utilized which need not rotate about a long arc. In the preferred embodiment, the shaft of the gear reducer can be rotated about a small arc in order to switch the electronic lock from the locked to the unlocked position (and vice-versa). More details on this embodiment are discussed in U.S. Pat. No. 6,297,725, the content of which is incorporated by reference.

In one implementation, the electronic lock and the key can each be controlled by a single chip ZigBee system-on-a-chip (SOC) that contains an IEEE 802.15.4 radio-transceiver, a microcontroller, program/data memory (flash and RAM) and necessary peripherals. The ZigBee SOC has built-in encryption support for securely transmitting the key over the wireless mesh network. In addition, the lock or the key can transmit voice wirelessly with the mesh network lock or key acting as a voice transceiver or walkie-talkie in communication with another walkie-talkie over the mesh network in one embodiment. The mesh network can include an appliance having a communicator jack wired to a plain old communicator service (POTS) or a public switched communicator network (PSTN) land-line so that the person trying to access the room or facility can talk with a remote authorized room person or a remote administrator/supervisor outside of the room or facility. When an individual wishes to talk, a microphone on the key or the lock digitizes the audio and compresses the digitized audio data for transmission over the ZigBee wireless mesh network. A full duplex link can be established between a base station and the key or lock Zigbee electronics so that transmission of voice and/or data occurs in two directions simultaneously. Since the voice link is full-duplex, both parties can talk at once.

Figure 3A:
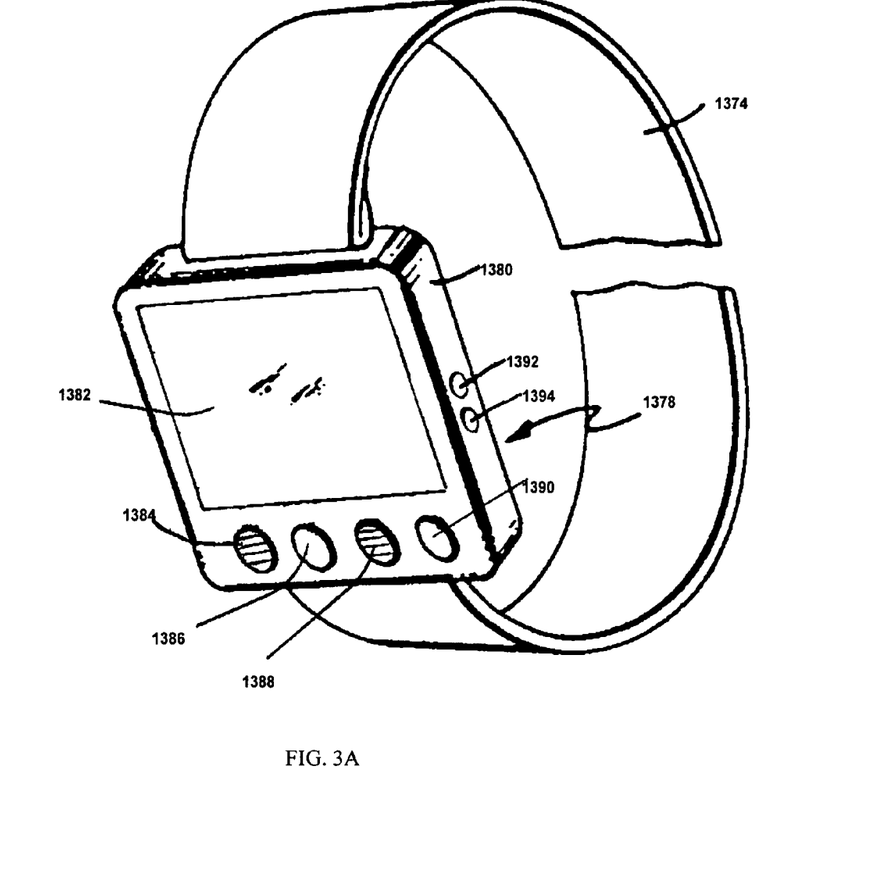
FIG. 3A is a block diagram of an exemplary wristwatch mesh network appliance or device.

FIG. 3A shows a portable embodiment of the present invention where the key 400 is a wrist-watch embodiment. As shown in FIG. 7, the device includes a wrist-watch sized case 1380 supported on a wrist band 1374. The case 1380 may be of a number of variations of shape but can be conveniently made a rectangular, approaching a box-like configuration. The wrist-band 1374 can be an expansion band or a wrist-watch strap of plastic, leather or woven material. The wrist-band 1374 further contains an antenna 1376 for transmitting or receiving radio frequency signals. The wristband 1374 and the antenna 1376 inside the band are mechanically coupled to the top and bottom sides of the wrist-watch housing 1380. Further, the antenna 1376 is electrically coupled to a radio frequency transmitter and receiver for wireless communications with another computer or another user. Although a wrist-band is disclosed, a number of substitutes may be used, including a belt, a ring holder, a brace, or a bracelet, among other suitable substitutes known to one skilled in the art. The housing 1380 contains the processor and associated peripherals to provide the human-machine interface. A display 1382 is located on the front section of the housing 1380. A speaker 1384, a microphone 1388, and a plurality of push-button switches 1386 and 1390 are also located on the front section of housing 1380.

In one implementation, the circuitry can recognize speech, namely utterances of spoken words by the user, and converting the utterances into digital signals. The circuitry for detecting and responding to verbal commands includes a central processing unit (CPU) connected to a ROM/RAM memory via a bus. The CPU is a preferably low power 16-bit or 32-bit microprocessor and the memory is preferably a high density, low-power RAM. The CPU is coupled via the bus to processor wake-up logic, one or more accelerometers to detect sudden movement in a patient, an ADC which receives speech input from the microphone. The ADC converts the analog signal produced by the microphone into a sequence of digital values representing the amplitude of the signal produced by the microphone at a sequence of evenly spaced times. The CPU is also coupled to a digital to analog (D/A) converter, which drives the speaker to communicate with the user. Speech signals from the microphone are first amplified, pass through an antialiasing filter before being sampled. The front-end processing includes an amplifier, a bandpass filter to avoid antialiasing, and an analog-to-digital (A/D) converter or a CODEC. To minimize space, the ADC, the DAC and the interface for wireless transceiver and switches may be integrated into one integrated circuit to save space. More exemplary structure to recognize speech is discussed in U.S. Pat. No. 6,070,140 by the inventor of the instant invention, the content of which is incorporated by reference.

In one embodiment, the processor and transceiver communicates with other appliances using the ZigBee protocol. ZigBee system provides a cost-effective, standards-based wireless networking solution that supports low data-rates, low-power consumption, security, and reliability. Single chip ZigBee controllers with wireless transceivers built-in include the Chipcon/Ember CC2420 and from FreeScale. In various embodiments, the processor communicates with a Z axis accelerometer measures the patient's up and down motion and/or an X and Y axis accelerometer measures the patient's forward and side movements. The controllers upload the captured data when the memory is full.

In yet another embodiment, any or all of the nodes may include transducers for acoustic, infrared (IR), and radio frequency (RF) ranging. Therefore, the nodes have heterogeneous capabilities for ranging. The heterogeneous capabilities further include different margins of ranging error. Furthermore, the ranging system is re-used for sensing and communication functions. For example, wideband acoustic functionality is available for use in communicating, bistatic sensing, and ranging. Such heterogeneous capability of the sensors 40 can provide for ranging functionality in addition to communications functions. As one example, repeated use of the communications function improves position determination accuracy over time. Also, when the ranging and the timing are conducted together, they can be integrated in a self-organization protocol in order to reduce energy consumption. Moreover, information from several ranging sources is capable of being fused to provide improved accuracy and resistance to environmental variability. Each ranging means is exploited as a communication means, thereby providing improved robustness in the presence of noise and interference. Those skilled in the art will realize that there are many architectural possibilities, but allowing for heterogeneity from the outset is a component in many of the architectures.

The term "positional measurement," as that term is used herein, is not limited to longitude and latitude measurements, or to metes and bounds, but includes information in any form from which geophysical positions can be derived. These include, but are not limited to, the distance and direction from a known benchmark, measurements of the time required for certain signals to travel from a known source to the geophysical location where the signals may be electromagnetic or other forms, or measured in terms of phase, range, Doppler or other units. In this manner, a visitor to the home or office can be tracked with precision for intrusion monitoring, direction assistance or other monitoring purposes.

The system can include a patient monitoring appliance coupled to the POTS or PSTN through the mesh network. The patient monitoring appliance monitors drug usage and patient falls using accelerometers. The patient monitoring appliance monitors patient movement. A call center can call to the communicator to provide a human response.

The wristwatch device can also be used for home automation. The user can enjoy flexible management of lighting, heating and cooling systems from anywhere in the home. The watch automates control of multiple home systems to improve conservation, convenience and safety. The watch can capture highly detailed electric, water and gas utility usage data and embed intelligence to optimize consumption of natural resources. The system is convenient in that it can be installed, upgraded and networked without wires. The patient can receive automatic notification upon detection of unusual events in his or her home. For example, if smoke or carbon monoxide detectors detect a problem, the wrist-watch can buzz or vibrate to alert the user and the central hub triggers selected lights to illuminate the safest exit route.

Figure 3B:
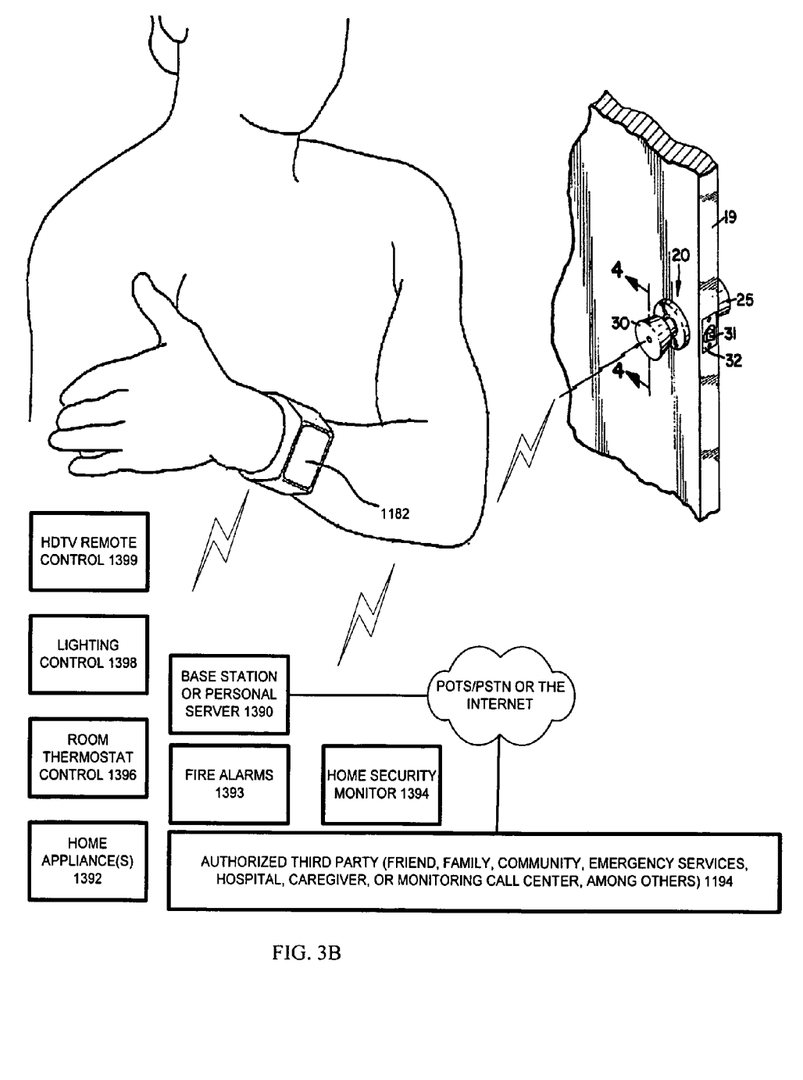
FIG. 3B shows an exemplary system with the wristwatch for security monitoring.

FIG. 3B shows an exemplary system with the wristwatch for security monitoring. Data collected and communicated on the display 1382 of the watch as well as voice is transmitted to a base station 1390 for communicating over a network to an authorized party 1394. The watch and the base station is part of a mesh network that may communicate with an electronic door lock such as the lock of FIG. 2. The mesh network also includes a plurality of home/room appliances 1392-1399. The ability to transmit voice is useful to allow a visitor to announce his/her presence at the door. Hence, in one embodiment, the watch captures voice from the user and transmits the voice over the Zigbee mesh network to the base station 1390. A resident can answer the voice request. Alternatively, if no one is at home or at the office, the base station 1390 in turn dials out to an authorized third party to allow voice communication and at the same time transmits the collected visitor data and identifying information so that appropriate action can be taken efficiently and error-free. In one embodiment, the base station 1390 is a POTS telephone base station connected to the wired phone network. In a second embodiment, the base station 1390 can be a cellular telephone connected to a cellular network for voice and data transmission. In a third embodiment, the base station 1390 can be a WiMAX or 802.16 standard base station that can communicate VOIP and data over a wide area network. I one implementation, Zigbee or 802.15 appliances communicate locally and then transmits to the wide area network (WAN) such as the Internet over WiFi or WiMAX. Alternatively, the base station can communicate with the WAN over POTS and a wireless network such as cellular or WiMAX or both. In another embodiment, the watch serves as a mobile communicator when there are sufficient ZigBee radios in a particular neighborhood. In that case, calls are routed through the mesh network to the wristwatch for voice calls.

In another embodiment, the watch serves a key fob allowing the user to wirelessly unlock doors controlled by ZigBee wireless receiver. In this embodiment, when the user is within range, the door ZigBee transceiver receives a request to unlock the door, and the ZigBee transceiver on the door transmits an authentication request using suitable security mechanism. Upon entry, the ZigBee doorlock device sneds signals to the lighting, air-conditioning and entertainment systems, among others. The lights and temperature are automatically set to pre-programmed preferences.

Figure 4:
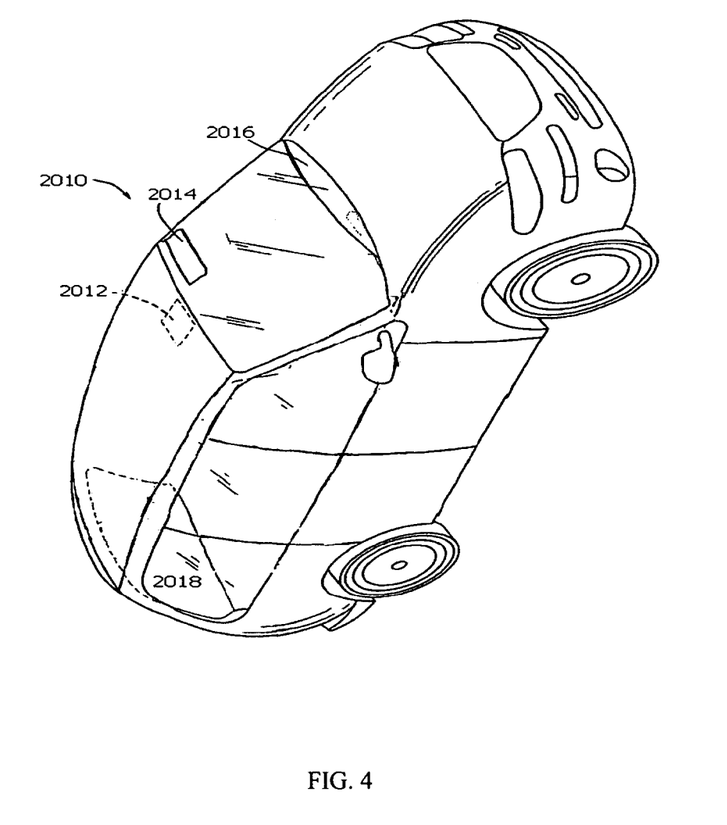
FIG. 4 shows an exemplary vehicle that can communicate with the mesh network of FIG. 1 to open a garage door or to open the vehicle door(s).

Referring now to FIG. 4, a vehicle 2010, which may be an automobile, truck, sport utility vehicle (SUV), mini-van, or other vehicle, includes a wireless control system 2012. Wireless control system 2012 is illustrated mounted to an overhead console of vehicle 2010. Alternatively, one or more of the elements of wireless control system 2012 may be mounted to other vehicle interior elements, such as, a visor 2014 or instrument panel 2016 or back window 2018. Alternatively, wireless control system 2012 could be mounted to a key chain, keyfob or other handheld device. The wireless control system 2012 is illustrated along with a home electronic system which may be any of a plurality of home electronic systems, such as, a garage door opener, a security gate control system, security lights, home lighting fixtures or appliances, a home security system, among others, that are mesh network compatible. For example, home electronic system may be a mesh network garage door opener. The home electronic system may also be a lighting control system using the X10 communication standard. Home electronic system includes an antenna for receiving wireless signals including control data which will control home electronic system. The wireless signals are preferably Zigbee signals at 2.4 GHz but can be in the ultra-high frequency (UHF) band of the radio frequency spectrum, infrared signals or other wireless signals. Wireless control system 2012 can receive navigation data from one or more navigation data sources, such as a GPS receiver, a vehicle compass, a radar or sonar sensor, and/or other sources of navigation data, such as gyroscopes, for example.

In one embodiment, the wireless control system 2012 transmits to a garage controller an identification (ID) signal which can be encrypted. The signal is received by the home electronics and the signal strength is ascertained. When the signal strength passes a certain threshold and the ID is authenticated, the garage controller opens the garage door. In another embodiment, the in-door positioning system described above can detect when the vehicle is within a predetermined distance or range and automatically open the garage door after authentication of a security code without requiring the driver to push a remote control button to open the garage door. The system thus provides an "automatic" or "unconscious" connection when the car and the door devices are in proximity with one another. By "automatic" or "unconscious" it is meant an immediate communications link which is established between two or more electronic devices as soon as the devices are within a certain range, for example, twenty meters, of each other without any command being input to any of the devices by the user. This limitation has up until the present required the user to provide one or more commands to at least one of the electronic devices to begin the process of transferring data between the two devices.

The vehicle typically includes an audio system and a display system. The display system may be mounted-in a dashboard or instrument panel, an overhead console, a floor mounted console, a visor, a rear view mirror or at a wide variety of other locations inside the vehicle. The display may comprise a small cathode ray tube ("CRT"), a liquid crystal display ("LCD") or various other forms of displays which are easily visible in daytime as well as nighttime driving conditions. The vehicle has a mesh network transceiver that enables a wireless communications link to be established with the mesh network. Once established, the communications link enables a wide variety of useful information such as personal calendars, e-mail messages, telephone directories, and virtually any other form of text information to be sent over the mesh network to be displayed on the vehicle's display system.

In some situations, a garage door opener will not be configurable for "up only" operation. In these situations, an auxiliary wireless transmitter can be used. The auxiliary wireless transmitter is disposed in the vicinity of the garage door opener (e.g., coupled to the garage wall, ceiling, or a mounting bracket) and includes a housing, a receiver, a control circuit, a garage door state sensor, and an interface circuit. The garage door state sensor is configured to detect whether the garage door is open or closed. For example, a mercury switch is coupled to the garage door which changes state based on whether the switch (or door) is vertical (garage door open) or horizontal (garage door closed). The switch includes an interface circuit configured to transmit the switch state over a wired or wireless connection to the auxiliary wireless transmitter. The auxiliary wireless transmitter is configured to receive the switch state and wireless control data from system 2012 indicating an "up only" command. If the garage door is closed, the auxiliary wireless transmitter will send an "open door" command via an interface circuit having a wired or wireless communication link to the garage door opener to open the garage door. The receiver, control circuit, and interface circuit are all coupled to and preferably at least partially recessed in the housing. The interface circuit is configured to provide the "open door" command from within the housing to the existing garage door opener outside the housing. If the garage door is already open, the auxiliary wireless transmitter will not send a command to the garage door opener. In this embodiment, the auxiliary wireless transmitter and garage door state sensor act as a kit which provides "up-only" functionality to an existing garage door opener.

Figure 5:
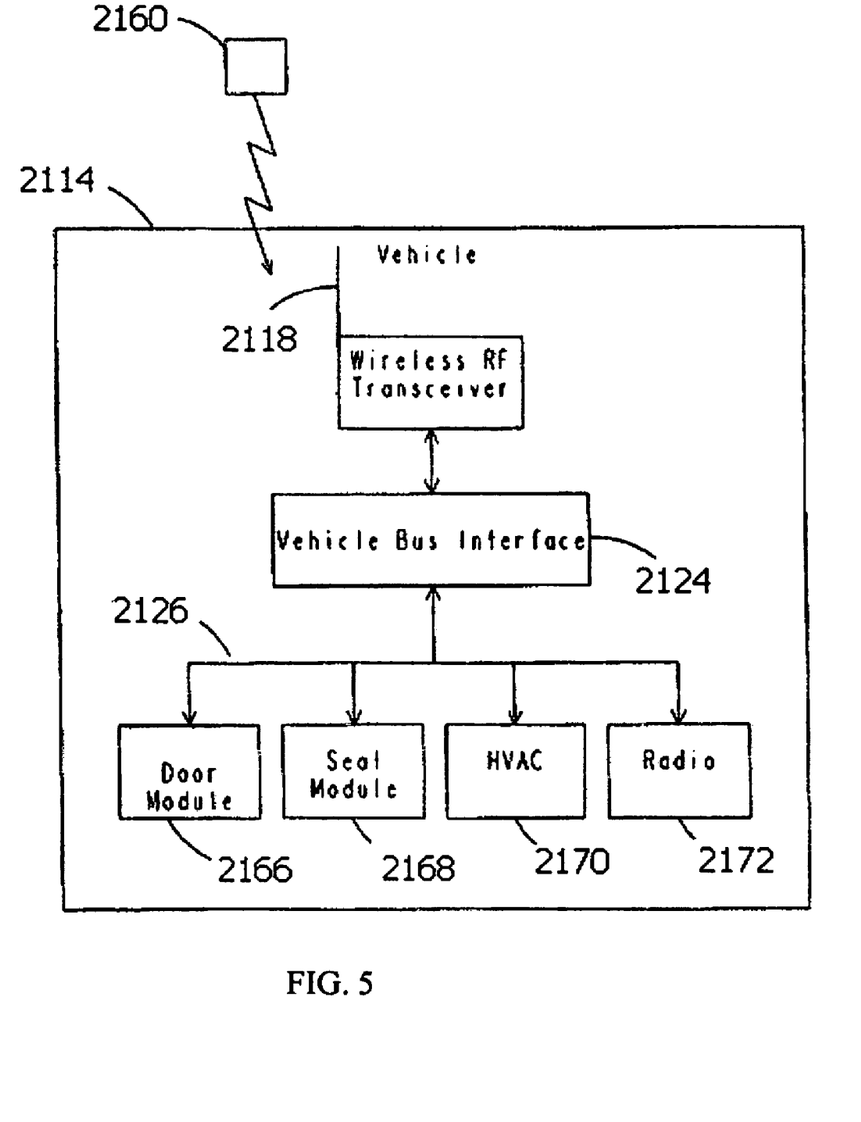
FIG. 5 shows an exemplary mesh network car diagnostic system.

FIG. 5 shows an exemplary remote car control system. A fixed mesh network sensor 2160, or alternatively a programmable key wristwatch or fob 2160, can receive data from various components of the vehicle of FIG. 4. The key wristwatch or fob 2160 includes a mesh network transceiver that communicates with the wireless mesh network, an antenna and a data storage device or memory. The car mesh network transceiver is integrated into the vehicle electronics to communicate with the vehicle bus interface 2124 via the vehicle bus 2126, and further with various modules 2166-2172 for controlling various components of the vehicle.

In the wristwatch or fob embodiment, as the user approaches the vehicle when wearing the watch or carrying the key fob 2160, a wireless communications link is automatically established between the mesh network transceivers. Information stored in the memory 2164 of the key fob 2160 is then transmitted to the mesh network and used to control various modules of the vehicle in accordance with preprogrammed settings by the user. Thus, information relating to the precise position of a power seat, volume and channel information of the radio 2172, climate control information for the HVAC 2170, rearview mirror or external mirror position information, etc., can all be stored in the memory 2164 and automatically transmitted to the vehicle as the user approaches the vehicle. The seats of the vehicle, climate control settings, radio channel and volume settings, mirror positions, etc. can all be automatically adjusted by suitable vehicle electronics even before the user enters the vehicle. In another implementation the key fob or wristwatch 2160 is used to interrogate a PC at the user's place of business. Selected files stored on the hard drive or in random access memory (RAM) of the PC can be transmitted via a wireless communications link established between the mesh network transceiver of the wristwatch or key fob 2160 and the PC mesh network transceiver, which is integrated with the PC. The information is stored in the memory of the wristwatch or the key fob 2160 before the user leaves his/her place of business. As the user arrives at his/her home, a home PC is automatically linked with the wristwatch or key fob 2160 by the RF transceiver 10a of the key fob 60 and a second RF transceiver 10b integrated with the home PC. The automatically created wireless communications link is used to transmit information stored in the memory 2164 of the key fob 2160 to the individual's home PC.

In one embodiment, the wristwatch or fob 2160 activates the ignition and throttle of a vehicle when the user approaches the vehicle or when the user remotely pushes a start button. Timers allow the ignition cycle to start the vehicle and shut off the unit if the car fails to start. The oil pressure and water temperature of the engine are monitored and the unit shuts off the car in case the oil pressure or water temperature become dangerous. The vehicle's air conditioning or heater may also be activated to cool or heat the car to a desired level. Once the engine is running and the desired climatic level is reached, the vehicle's horn signals that the car is ready to drive. More details on the remote control of the vehicle are disclosed in U.S. Pat. No. 5,129,376, the content of which is incorporated by reference.

In another embodiment, a garage computer or other electronic instrument loaded with diagnostic software for the vehicle is in wireless communications with a vehicle interface system 2124. The vehicle interface system 2124 is in turn coupled for two way communications via a data bus 2126 with various electronic subsystems of the vehicle such as the vehicle's Electronic Control Module (ECM), a fuel sensor, an exhaust sensor, a wheel speed sensor or virtually any other form of sensor which provides an electronic output signal related to its operation. Other nonexclusive examples of the types of sensors that may provide an electronic output signal include oxygen sensors, fluid temperature sensors (e.g., engine coolant, fuel, oil), exhaust and emission sensors, oil pressure sensors, transmission sensors, engine timing sensors, or any other type of sensor that may provide signals to an on-board diagnostic module (e.g., OBD II, etc.) or other vehicle system. Further, any of a variety of conditions of the vehicle electronic subsystems may be monitored by such sensors (e.g., high voltage, low voltage, temperature, pressure, malfunctions, and a variety of others), and signals representative of any of the variety of functions and operations may be output by the sensors. The wireless data link is created automatically as soon as the vehicle is near or enters the garage with the mesh network access. The car mesh network transceiver automatically begins transmitting diagnostics information stored in an associated memory (not shown) to diagnostics equipment connected to the mesh network. Information is transmitted to the diagnostic equipment as it is received from the vehicle interface 2124 from each of the sensors/components under test. This information is then forwarded to a dealership or a car manufacturer database and can be used by service personnel to determine the operational status of each of the sensors/components on-board the vehicle.

In another embodiment supporting retail transactions, a drive-through menu board has a mesh network transceiver that communicates with the vehicle's mesh network transceiver. As the vehicle approaches the drive-through menu board, the mesh network transceivers automatically establish a wireless voice and data communications link. A secure data link is established between the car and the merchant through which electronic payment can be authorized by the driver of the vehicle. Menu data/information can be automatically downloaded over the mesh network communications link between the mesh network transceivers. The transmitted information can be rendered on the vehicle's display system and/or the vehicle's audio system for playback. With a car microphone in the vehicle, authorization for the transaction may be provided verbally by the driver and transmitted through the mesh network communications link between the transceivers back to the drive-through menu board. This embodiment enables drive-through banking transactions, drive-through prescription ordering-or a wide variety of other retail transactions made from within a vehicle without the need for the driver to leave the vehicle to effect the transaction. Other applications could include toll collecting, fuel purchases at service stations and other transactions that could potentially be made more conveniently and more quickly by the use of the wireless mesh network communications system.

In yet another embodiment, the system enables the driver or other vehicle occupant to speak directly into the microphone to record any notes or other information which the user would otherwise write down on paper, but which cannot be accomplished easily while driving the vehicle. The voice information is stored as a .WAV file that can be saved and transmitted when the vehicle is parked in the garage. The notes or other information can be transmitted over the home electronics mesh network and played back once the user reaches his/her destination.

In yet another embodiment, a unique Vehicle Identification Number ("VIN") is encoded as part of the code to open the garage door. In other embodiments, the VIN can be used by the computer to access a database which is remote from the vehicle to obtain warranty and part information. It will be appreciated that this information could also be accessed through a web site of the manufacturer of the vehicle.

In another embodiment, a home PC is used to retrieve information from the Internet (e.g., audio books, news, weather, music, etc.) at a convenient time. Once this information is received by the home PC it is transmitted via the mesh network wireless communications link between the two mesh network transceivers automatically. For this to occur, it will be appreciated that the vehicle is parked in the proximate vicinity of the home PC for reception and storage of the transmitted PC content. The user can then display or play back the information while traveling in the vehicle at the user's convenience. If the data is audio data, then it is played back through the vehicle audio system. Text information which is received may be converted to audio information if a suitable text-to-speech conversion circuit is provided. The information stored could include traffic information, daily calendar reminders, appointments or events, e-mail messages, etc., in addition to the book, news, weather and music information mentioned above. The mesh network transceivers can also be used to enable information relating to various "points of interest" along a route being traveled by the user. This information could also be "personalized" information for the user from an Internet-based information service. In one embodiment, personalized information from an Internet based information service can be transferred from a suitable electronic system located at or closely adjacent to a gasoline pump, or at a kiosk including the gasoline pump, when the users vehicle comes within the vicinity of the gasoline pump. The personalized information could also be obtained from the Internet by establishing wireless communications links with electronic devices located on road signs, freeway overpasses, at traffic lights and other points along a road or highway, among others.

The system provides in automotive applications the wireless exchange of voice and/or data between various portable electronic devices and various electronic subsystems of a motor vehicle. The home electronics system is readily integrated with a wide variety of electronic devices such as notebook computers, pagers, PDAs, cellular phones, etc., and car key can be integrated with various electronic subsystems of a motor vehicle such as an audio system, microphone, in-dash or overhead display system, on-board navigation system, among others. The system can automatically establish a wireless communications link as soon as the mesh network electronic devices come into proximity with the vehicle, where the vehicle incorporates the mesh network transceiver to communicate with the house electronics. The system obviates the need for any external cables to be attached between the electronic device(s) and the subsystem(s) of the vehicle.

The system enables a vehicle to be maintained on a daily basis. For example, a high speed wireless communications link could be established between a vehicle and an electronic device located in the garage such that information relating to the operational status of any of a variety of electronic substations of the vehicle would be automatically transmitted to the electronic device for subsequent transmission to a car dealership or authorized car repair center. The information could be transmitted upon arrival of the vehicle within the garage. Transmission of vehicle diagnostic information using a wireless communications link may reduce the amount of time necessary to diagnose problems with a vehicle and increase the efficiency of providing service for a vehicle.

Although ZigBee is mentioned as an exemplary protocol, other protocols such as Bluetooth and WiFi and WiMAX can be used as well.

"Computer readable media" can be any available media that can be accessed by client/server devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art. The specific embodiments described herein are offered by way of example only. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An electronic door lock system, comprising:
an electrically actuated arm having a first position to allow access to an area and a second position to secure the area;
a mesh network to wirelessly communicate with one or more appliances;
a mesh network key accessed by a user and coupled to the mesh network to send a code;
a mesh network lock controller coupled to the electrically actuated arm and to the mesh network, said controller moving the electrically actuated arm to the first position upon authenticating the code, wherein two-way voice communication is captured by the mesh network key or an appliance coupled to the mesh network and transmitted via the mesh network proximate to an arm actuation.

2. The system of claim 1, wherein the mesh network comprises one of: an 802.15 network, a ZigBee network.

3. The system of claim 1, wherein a voice message is captured by one of: the mesh network key and the mesh network lock controller.

4. The system of claim 3, wherein the message is sent to a remote listener using one of: Plain Old Telephone Service (POTS), cellular telephone service, Voice Over Internet Protocol (VOIP).

5. The system of claim 1, wherein the code comprises a cryptographic code.

6. The system of claim 1, wherein the electrically actuated arm comprises a motor driving a garage door and wherein the mesh network lock controller opens the garage door without user action after an automatic authentication of an approaching vehicle.

7. The system of claim 1, wherein the electrically actuated arm opens one or more car door locks.

8. The system of claim 1, wherein the electrically actuated arm applies power to an appliance to turn on the appliance.

9. The system of claim 1, comprising a mesh network appliance to provide home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, and remote diagnostic.

10. The system of claim 1, wherein the mesh network is coupled to a wide area network including the Internet.

11. The system of claim 1, comprising an in-door positioning system coupled to one or more mesh network appliances to provide location information.

12. The system of claim 1, comprising a call center coupled to the mesh network to provide a human response.

13. The system of claim 1, comprising a web server coupled to the mesh network and to the POTS to provide information to an authorized remote user.

14. The system of claim 1, comprising a wireless router coupled to the mesh network and wherein the wireless router comprises one of: 802.11 router, 802.16 router, WiFi router, WiMAX router, Bluetooth router, X10 router.

15. The system of claim 1, comprising a mesh network appliance coupled to a power line to communicate X10 data to and from the mesh network.

16. A method to provide access to a secured area, comprising:
   actuating an electrically actuatable arm having a first position and second position;
   sending a code from a mesh network key and wirelessly communicating the code with one or more mesh network appliances over a mesh network;
   capturing two-way voice communication by the mesh network key or a mesh appliance coupled to the mesh network and transmitting the two-way voice communication via the mesh network;
   receiving the code over the mesh network by a mesh network lock controller; and
   providing access to the secured area upon authenticating the code.

17. The method of claim 16, wherein the mesh network comprises an 805.15 network.

18. The method of claim 16, comprising capturing and transmitting a voice message by one of: the mesh network key and the mesh network lock controller.

19. The method of claim 18, wherein the message is sent to a remote listener using one of: Plain Old Telephone Service (POTS), cellular telephone service, Voice Over Internet Protocol (VOIP).

20. The method of claim 16, wherein the code comprises a cryptographic code and wherein the mesh network appliance provides home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, and remote diagnostic.

* * * * *